March 17, 1936.  R. SONNENBERG  2,034,493
AUTOMOBILE GUARD
Filed March 16, 1934  2 Sheets-Sheet 1
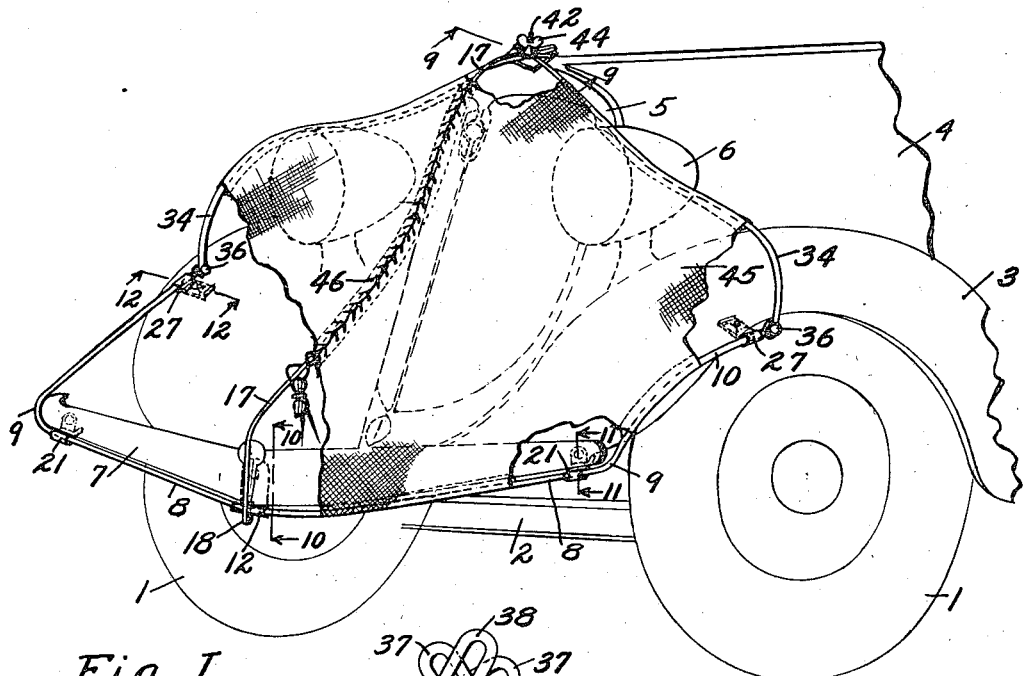
Fig. I
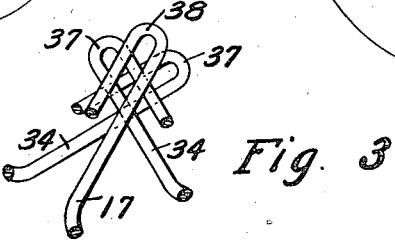
Fig. 3
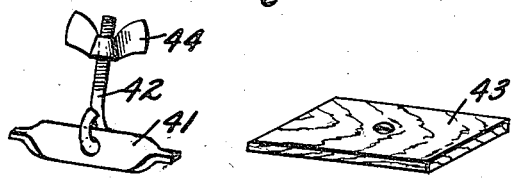
Fig. 4  Fig. 5
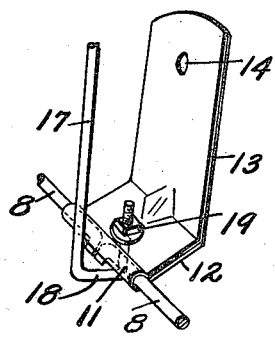
Fig. 2
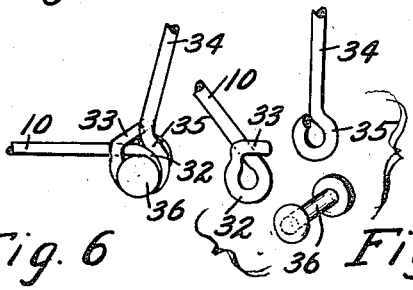
Fig. 6  Fig. 7
INVENTOR.
Rudolph Sonnenberg
BY
ATTORNEYS.

March 17, 1936. R. SONNENBERG 2,034,493
AUTOMOBILE GUARD
Filed March 16, 1934 2 Sheets-Sheet 2

INVENTOR.
Rudolph Sonnenberg
BY
ATTORNEYS.

Patented Mar. 17, 1936

2,034,493

UNITED STATES PATENT OFFICE 2,034,493

AUTOMOBILE GUARD

Rudolph Sonnenberg, South Bend, Ind.

Application March 16, 1934, Serial No. 715,920

7 Claims. (Cl. 293—41)

This invention relates to shields for automobiles and particularly to a shield adapted to be attached to the front of an automobile for use while the automobile is being towed immediately behind another vehicle.

The principal object of my invention is to provide a frame adapted to be attached to several parts of an automobile by means so that the frame is held in spaced relation to the adjacent automobile part and having a flexible covering mounted on the frame to cover the front of an automobile.

A further object is to provide a frame having a member conforming generally with the shape of an automobile bumper and having upwardly and rearwardly extending frame portions conforming generally to the shape of the fenders of the automobile, and braces extending therefrom which are adapted to be attached in the radiator filler opening, the frame members and braces being covered with flexible material in spaced relation to the automobile parts.

A further object is to provide a frame adapted to be attached to the automobile bumper, fenders and to the radiator filler member and covered with a flexible material maintained in spaced relationship to the automobile parts.

A further object is to provide a shield adapted to be detachably secured to the front of an automobile which shield includes a flexible covering maintained in spaced relationship to the automobile parts, the shield being jointed to be "knocked down" and folded into a relatively small package when not in use.

Further objects and objects relating to details of construction and methods of manufacture will be apparent from the detailed description to follow and from the drawings forming a part of this application.

In the towing of an automobile immediately behind another vehicle considerable damage is often done to the towed car due to stones and mud being thrown by the rear wheels of the front vehicle against the bumper, fenders, radiator and other exposed parts of the towed automobile against which the objects thrown may hit. In towing such automobiles, the drivers have resorted to attaching cardboard or canvas to the front of the rear automobile, and in some cases have pasted paper and other materials on the front of the automobile to protect the finish against the objects thrown from the driving vehicle. All of these makeshift guards have been relatively ineffective because no means was provided to maintain the guard in spaced relation with the parts which it was desired to protect. For example, when paper was pasted on to the fenders, mud and water thrown from the wheels of the driving vehicle against the protecting material would soon soak loose and then any hard object hitting the parts immediately beneath the paper would be damaged to the same extent as if no attempt has been made to shield the same. Furthermore, when the protector was laid immediately against the parts to be protected, stones and other hard objects hitting the same would dent and mar the automobile and do practically as much damage as though no protection had been used. Where cardboard and other hard material have been used, the same would chafe and wear the finish so that repair thereto would be necessary even though the car was towed only a comparatively short distance.

In my invention, I have so formed the frame that the burlap or other material which is used to cover the same is maintained in spaced relationship to the parts to be protected, so that all the disadvantages encountered by the makeshift shields heretofore used have been overcome, as any stones, mud or dirt thrown from the wheels of the driving vehicle cannot contact with the parts of the automobile being towed.

Referring to the numbered parts of the drawings in which like numerals refer to like parts throughout the several views, Fig. 1 is a perspective view of a front end of an automobile, showing my invention applied thereto.

Fig. 2 is a detailed fragmentary perspective view showing a part of the frame for the shield and the bracket for attaching the same to the bumper adjacent to the center thereof.

Fig. 3 is a perspective view showing the parts of the frame at the top thereof which are formed to fit over the radiator filler opening.

Fig. 4 is a perspective view showing the bolt adapted to extend through the loops formed in the frame members shown in Fig. 3, and the bar attached thereto adapted to be inserted in the radiator filler opening.

Fig. 5 is a perspective view of the bar or washer adapted to fit over the radiator filler opening immediately beneath the frame members shown in Fig. 3.

Fig. 6 is a perspective view of the knuckle joint for connecting the frame member extending along the side of the fender and the frame member extending to the radiator.

Fig. 7 is a perspective view showing the parts illustrated in Fig. 6 in disassembled relationship.

Figure 8:
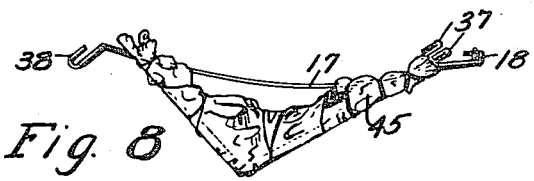
Fig. 8 is a plan view of the guard shown in folded position.

For the purpose of illustrating the utility and use of my invention, I have illustrated the forward end of an automobile with the front wheels 1 suitably connected with an axle 2 and having fenders 3 spaced from the wheels, a portion of the hood 4, a radiator 5, headlamps 6, and a bumper 7. The design, style, shape or model of the automobile is immaterial so far as my invention is concerned, as it is intended that the position of the attaching means may be so adjusted as to fit any of the automobiles now on the market which are equipped with front fenders, a bumper and a radiator.

The frame for my shield comprises a pair of frame members 8 which are formed to conform generally with the lower edge of the bumper 7 and are bent at 9 to extend rearwardly and form frame portions 10 conforming generally with the shape of the lower outer edge of the fenders 3. The adjacent ends of the frame members 8 fit into the looped end 11 of a bracket 12 having an upwardly extending plate portion 13 provided with an opening 14 therein adapted to be inserted over the bolt 15 attached to the bumper 7. To connect the bracket 12 with the bumper 7, the nut 16 forming a part of the bumper construction is removed from the bolt 15, the bracket 12 inserted thereover and the nut 16 is again screwed in position to hold the bracket 12 securely thereon. A frame member 17 having a looped lower end 18 is inserted through a hole in the bracket 12 and secured in position thereon by the nuts 19 at opposite sides thereof.

Figure 11:
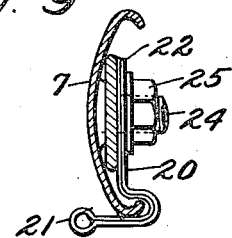
Fig. 11 is an enlarged detailed sectional view taken on the line 11—11 of Fig. 1, showing the means for attaching the frame to the bumper adjacent to the ends thereof.
Figure 14:
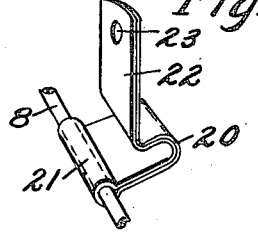
Fig. 14 is a perspective view of the attaching means shown in Fig. 11.

Referring to Figs. 1, 11 and 14, the frame members 8 are attached to the bumper 7 adjacent to the ends thereof by means of the brackets 20 which have looped ends 21 adapted to slide on the frame members 8 to be adjustable relative thereto. The brackets 20 are formed to fit around the lower edge of the bumper and then extend upwardly to form plates 22 having openings 23 therein adapted to fit over the bolts 24 forming a part of the bumper construction and held in place thereon by the nuts 25 also forming a part of the bumper structure. The brackets 12 and 20 are both preferably formed of sheet metal and may be spread apart to fit over the frame members 8 after the flexible covering has been applied thereto, or the covering may be cut away at that point and the brackets attached directly on the frame members.

Figures 10, 12:
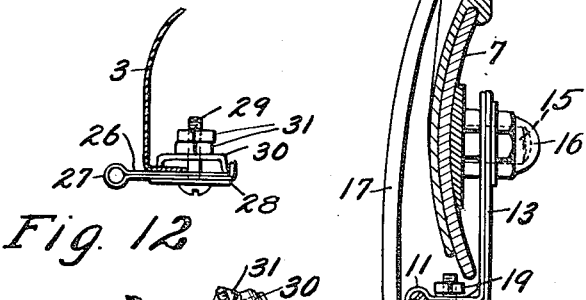
Fig. 10 is an enlarged detailed sectional view taken substantially on the line 10—10 of Fig. 1, showing a means for attaching the frame to the bumper at the center thereof.
Fig. 12 is an enlarged detailed sectional view taken on the line 12—12 of Fig. 1, showing the means for attaching the frame to the vehicle fender.
Figure 13:
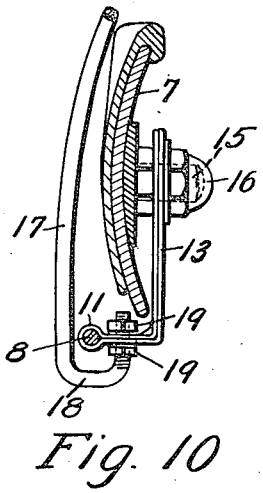
Fig. 13 is a perspective view of the attaching means shown in Fig. 12.

Referring particularly to Figs. 1, 12 and 13, the frame portions 10 are maintained in spaced relationship with the fenders 3 by means of the brackets 26 which also have looped ends 27 fitting over the respective frame members and having plate portions 28 fitting under the lower flanged edge of the adjacent fender. Each bracket 26 is perforated to receive the bolt 29 which also extends through a perforation in a clip 30 having one edge fitting over the fender flange and the other edge directed against the plate portion 28 to be clamped in position thereon by the nut 31. It will thus be seen that when the bracket 26 is applied beneath the fender 3, the clip 30 is applied to the top face of the flange on the fender and the nut 31 is tightened down on the bolt 29 that the bracket is maintained in fixed position on the fender and the frame portion 10 is maintained in spaced relationship with the fender.

To permit folding of the shield when not in use, I prefer to hinge the frame members together and referring particularly to Figs. 1, 6 and 7, I provide the frame portions 10 with looped ends 32 having the ends 33 folded over the frame portion 10 to provide stops. The frame members 34 which extend from the outer lower edges of the fender 3 to the radiator also have looped ends 35. The looped ends 32 of the frame portions 10, and the looped ends 35 of the frame members 34 are connected together with the rivets or bolts 36 in a manner to permit folding of the frame members when not in use. When in use, these members are prevented from collapsing by the stops 33 which prevent the frame members 34 from swinging inwardly beyond a predetermined limit and into contact with the fender 3.

The frame members 34 and the frame member 17 terminate at the radiator filler member and each of these frame members have looped ends 37 and 38. The bent over ends of the frame members preferably extend parallel with the main frame members for some distance to provide relatively long loops to permit adjustment of the frame members for different sizes or shapes of automobile fronts and to provide means whereby they can be attached at this point to the automobile without close adjustment.

Figure 9:
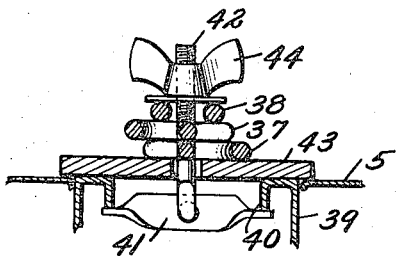
Fig. 9 is an enlarged detailed sectional view taken on the line 9—9 of Fig. 1, and also showing the parts illustrated in Figs. 3, 4 and 5 in assembled position and attached to the radiator filler member.

As illustrated in Fig. 9, the radiator 5 is provided with a core 39 having an inturned flange 40 to which the radiator cap may be attached. In assembling my guard to the automobile, the radiator cap is removed and the bar 41 which is connected with the bolt 42, is inserted in the filler opening after which the bar or washer 43 having a perforation therein is inserted over the bolt 42 on top of the filler opening, as shown in Fig. 9, and then the looped ends 37 and 38 on the frame members 34 and 17 respectively are inserted over the bolt 42' and the wing nut 44 is screwed down to hold the several parts in position.

Having now described the frame work for my guard, a flexible material 45 such as burlap, canvas, oilcloth, heavy paper or in some cases rubber is attached to the frame members 8, extensions thereof 10, and the frame members 34 to completely cover the frame work. In some constructions, it is more economical to form the flexible material in two pieces and lace the same together at 46 on the frame member 17 extending upwardly from the front of the bumper 7 to the radiator filler opening 39. To remove the shield from the automobile, it is only necessary to loosen the wing nut 44 and remove the bar 41 from the radiator filler opening whereupon the frame members 17 and 34 may be detached from the radiator; remove the nuts 31 from the bolts 29 to thereby remove the clips 30 from the fenders 3; unscrew the nuts 25 on the bumper bolts 24 to remove the clips 20, and remove the nut 16 from the bolt 15 to remove the clip 12. The frame members 8 can then be removed from the looped end of the bracket 12, the frame portions 10 and the frame members 34 folded together about the rivet 36, and the frame member 17 folded over to lie aside of the frame members 8. I thus provide a relatively small package which is light in weight and which can be readily shipped or carried to another automobile for use again and which can be stored in a relatively small space.

Figure 15:
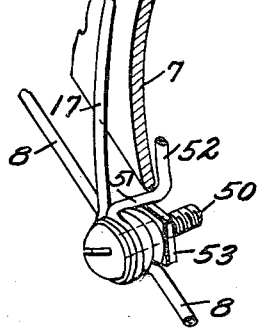
Fig. 15 is a sectional view similar to Fig. 10, showing a slightly modified means for attaching the frame to the bumper adjacent to the center thereof.

In Fig. 15, I have shown a modified form of joining the frame members 8 in which the frame members are provided with looped ends through which a bolt 50 is inserted. The frame member 17 is also provided with a looped end having a portion 51 beyond the loop extending substantially parallel with the bolt 50 in spaced relationship thereto and having the outer end thereof bent upwardly at 52 to be hooked under the lower edge of the bumper. When the bolt 50 is extended through the looped end of the frame member 17 and the looped ends of the frame members 8, and the nut 53 is tightened thereon, all of the parts will be in clamped position as is clearly shown. As the upper end of the frame member 17 is attached to the radiator and as the hooked end 52 on the outer lower end thereof is clamped under the lower edge of the bumper 7, the parts are maintained in proper position on the automobile without removing the nut 16 on the bolt 15, as shown in Fig. 10. When it is desired to fold the frame members, including the modification shown in Fig. 15, the bolt 50 merely acts as a pivot and the respective frame members can be turned thereon to folded position.

The flexible material 45 is folded over at its free edges and then stitched in spaced relation to the edges to provide pockets therealong in which the frame members may be inserted. In assembling the flexible material on the frame members, the same is slipped over the frame members 8, extensions 10 thereof, and the frame members 34 after which the clips are preferably attached to the frame members by inserting the same over the frame members and the flexible material. If it is not desired to put the clips over the flexible material, slits may be formed therein and the clips applied directly to the frame members as shown in the drawings.

It will be understood from the foregoing description that the flexible material 45 is maintained out of contact with any of the automobile parts so that any stones, dirt or mud which may strike against the flexible material will not be driven against the automobile parts to damage the same. For example, it has been found in practice that it is desirable to maintain the flexible material from the crown of the fenders at a distance of at least three inches. Also, the material is spaced from the radiator and some of the other automobile parts at a distance considerably greater than this distance from the fenders. It is to be understood that the dimensions which have been given are not controlling as limiting the scope of my invention but are merely illustrative of conditions which have been found to be desirable and satisfactory in commercial use.

While I have illustrated and described one embodiment of my invention, it is to be understood that various modifications can be made therein without departing from the spirit and substance of my invention, the scope of which is to be measured entirely by the scope of the sub-joined claims.

What I claim is:

1. In combination with a motor vehicle having a radiator, fenders and bumper, a shield for said vehicle comprising, a frame, brackets attaching said frame to said fenders and bumper, means for attaching said frame to said radiator, said brackets and means maintaining said frame in spaced relation to said vehicle, and a flexible material covering said frame.

2. In combination with a motor vehicle having a radiator, fenders and bumper, a shield for said radiator, bumper and the front portions of said fenders maintained in spaced relation to said vehicle comprising, a frame, means attaching said frame to said fenders, bumper and radiator, and a flexible material covering said frame.

3. In combination with a motor vehicle having a radiator, fenders and bumper, a shield for said radiator, fenders and bumper maintained in spaced relationship thereto comprising, a frame extending along the lower edges of said bumper and fenders, frame members extending from the free ends of said first-named frame to said radiator, means for attaching said frame to said bumper, fenders and radiator, and a flexible covering for said frame.

4. In combination with a motor vehicle having a radiator, fenders and bumper, a shield for said vehicle maintained in spaced relationship thereto comprising, a two-piece frame extending along the lower edges of said bumper and fenders, frame members extending from the free ends of said frame to said radiator, a frame member extending from the adjacent ends of said frame to said radiator, means for attaching said frame to said bumper, fenders and radiator, and a flexible covering for said frame.

5. In combination with a motor vehicle having a radiator, fenders and bumper, and a shield maintained in spaced relationship to said vehicle comprising, a frame extending along the lower edge of said bumper and along the lower outer edges of said fenders, frame members extending from and connected to the rear ends of said first frame to said radiator, a frame member attached to said first frame member extending to said radiator, means for attaching said frame members to said bumper, fenders and radiator, and a flexible material covering said frame.

6. In combination with a motor vehicle having a radiator, fenders and bumper, a shield for said vehicle maintained in spaced relationship thereto comprising, frame members extending along the lower edge of said bumper, means for attaching the adjacent ends of said frame members to said bumper, means for attaching said frame members to said bumper adjacent to the ends thereof, said frame members having rearwardly extending portions extending along the outer lower edges of said fenders, means for attaching said frame portions to said fenders, frame members pivotally attached to said fender frame portions, means for attaching said last-named frame members to said radiator, and a flexible material covering said frame members.

7. In combination with a motor vehicle having a radiator, fenders and bumper, a pair of frame members extending along the lower edge of said bumper and along the outer lower edges of said fenders, means for attaching the adjacent ends of said frame members to said bumper, means for attaching said frame members to said bumper adjacent to the ends thereof, means for attaching said frame members to said fender, a frame member attached to said first frame members extending upwardly and rearwardly to the top of said radiator, frame members pivotally attached to the free end of said first frame members and extending to said radiator, means including a member inserted in the radiator filler opening for attaching said frame members to said radiator, and a flexible material covering and extending between said frame members.

RUDOLPH SONNENBERG.